(12) United States Patent
Fritz

(10) Patent No.: US 7,089,669 B2
(45) Date of Patent: Aug. 15, 2006

(54) SHEET MATERIAL CUTTER WITH ADJUSTABLE BLADES

(76) Inventor: Alvin R. Fritz, 3225 Biddle, Wyandotte, MI (US) 48192

( * ) Notice: Subject to any disclaimer, the term of this patent is extended or adjusted under 35 U.S.C. 154(b) by 93 days.

(21) Appl. No.: 10/858,815

(22) Filed: Jun. 2, 2004

(65) Prior Publication Data

US 2005/0268469 A1    Dec. 8, 2005

(51) Int. Cl.
*B26B 13/00* (2006.01)
*B26B 29/00* (2006.01)

(52) U.S. Cl. .............................. 30/265; 30/287; 30/292

(58) Field of Classification Search ................. 30/265, 30/279.2, 292, 293, 294, 287
See application file for complete search history.

(56) References Cited

U.S. PATENT DOCUMENTS

| | | | |
|---|---|---|---|
| 541,463 A | 6/1895 | Thompson | |
| 769,081 A | 8/1904 | Hemington | |
| 982,743 A | 1/1911 | Potstada | |
| 1,098,671 A | 6/1914 | Lundy | |
| 1,511,892 A | 10/1924 | Lusby | |
| 1,609,619 A | 12/1926 | Galvin | |
| 1,720,305 A | 7/1929 | Tjernlund | |
| 3,380,158 A | 4/1968 | Du Bois | |
| 3,644,994 A | 2/1972 | Lind | |
| 3,710,444 A | 1/1973 | Fishman | |
| 4,283,853 A | * | 8/1981 | Fazzini ........................ 30/265 |
| 4,366,620 A | * | 1/1983 | McClure ...................... 30/264 |
| 4,574,480 A | | 3/1986 | Dunn |
| 4,922,778 A | | 5/1990 | Nagai |
| 5,179,884 A | | 1/1993 | Kutschker et al. |
| 5,438,757 A | | 8/1995 | Weschenfelder |
| 5,582,053 A | | 12/1996 | Chubb et al. |
| 5,899,000 A | | 5/1999 | Break et al. |

OTHER PUBLICATIONS

Van Mark Products Corp., TrimCutter Home Page, Oct. 13, 2003, http://www.van-mark.com/vanmarksite/accessories/trimcutter/trimcutter.html, USA (copy attached).
Van Mark Products Corp., TrimCutter Operation/Specs, Jun. 2, 2004, http://www.van-mark.com/vanmarksite/accessories/trimcutter/TCOperation.html, USA (copy attached).
Van Mark Products Corp., TrimCutter User's Guide, 2002, USA (available via Van Mark Products web site, above; copy attached).

(Continued)

*Primary Examiner*—Hwei-Siu Payer
(74) *Attorney, Agent, or Firm*—Keevican Weiss Bauerle & Hirsch, LLC; Blynn L. Shideler

(57) ABSTRACT

A small, handheld sheet material cutter has a pair of cooperating cutting wheels and a mechanism for easily adjusting the position of one of the cutting wheels in order to provide a lateral gap of varying width between the cutting edges of the two cutting wheels, thus permitting the cutter to cleanly cut sheet material of various thicknesses. The cutter also has a guide bar that can be used in combination with any sheet metal brake to provide straight cuts. Since the cutter need not be mounted on a sheet metal-brake, it can also be used freehand to cut curves and angles.

13 Claims, 4 Drawing Sheets

OTHER PUBLICATIONS

Tapco Products Company, Max Cut-Off web page, Oct. 13, 2003, http://www.tapcoint.com/tapco/web/MaxCutOff.html, USA (copy attached).

Seabreeze Awning & Siding Company, Pro III Accessories web page, Jun. 2, 2004, http://www.seabreezesiding.com/html/pro_iii_accsessories.html, USA (copy attached).

Seabreeze Awning & Siding Company, MAX-I-MUM Accessories web page, Jun. 2, 2004, http://www.seabreezesiding.com/html/max-i-mum_accessories.html, USA (copy attached).

Tapco Products Company, Manual for Pro Cut-Off and Max Cut-Off, Apr. 2002, USA (available via Seabreeze Awning & Siding Co. web pages above; copy attached).

* cited by examiner

SHEET MATERIAL CUTTER WITH ADJUSTABLE BLADES

RELATED APPLICATIONS

There are no applications related to this invention anywhere in the world.

BACKGROUND OF THE INVENTION

1. Field of the Invention

The present invention generally relates to devices for cutting sheet material such as sheet metal, vinyl or aluminum siding, and linoleum.

2. Description of the Prior Art

Various types of devices are presently used for cutting sheet material such as sheet metal, vinyl or aluminum siding, and linoleum. One type of device for this purpose typically has a pair of cooperating cutting wheels mounted in a housing so that both cutting wheels can rotate freely. The cutting wheels have sharpened, beveled cutting edges and are arranged in the housing such that the cutting edges are adjacent to and slightly overlap one another. In use, the edge of the material to be cut is positioned so that it will engage the cutting wheels at the point where the cutting edges overlap. Then, by pushing or pulling the cutting device across the material to be cut, or conversely, by pushing or pulling the material through the cutting device, the relative motion of the material and the cutting device causes the cutting wheels to rotate in opposite directions, cutting the material as it passes between them. Some cutting devices of this type are specifically designed to be used in combination with a sheet metal brake in order to make a straight cut through a piece of sheet metal clamped in the brake. In such an application, the cutting device is mounted on the sheet metal brake, which guides the cutting device to provide a straight cut.

One significant disadvantage of such prior art cutting devices is that they cannot be easily adjusted to vary the spacing between the cutting wheels. This can be a problem when attempting to cut materials having different thicknesses. For instance, when cutting heavier gauges of sheet metal, a cutting device having the cutting wheels immediately adjacent each other with no lateral gap between them will typically result in a bend in the cut edge, rather than a clean cut. In order to cut such heavier material without bending the cut edge, it is necessary to provide a slight lateral gap between the cutting edges of the cutting wheels. With known cutting devices, this adjustment requires partial disassembly of the cutting device in order to insert appropriate shims to achieve the desired gap. The necessary disassembly and reassembly can be very inconvenient and inefficient, especially when it is necessary to cut materials having different thicknesses.

Another disadvantage of the prior art cutting devices is that known devices intended for use in combination with a sheet metal brake are designed only for use with a particular type of sheet metal brake and cannot be used with brakes made by other manufacturers.

A further disadvantage of the prior art devices is that cutters intended for use in combination with a sheet metal brake are typically bulky and inconvenient to carry about, being intended for use while mounted on a sheet metal brake. Accordingly, they are typically poorly suited for use apart from a sheet metal brake, as might be necessary when cutting small work pieces at a worksite or making curved cuts.

Hence, there exists a need for a small, lightweight cutting device for sheet material that can be easily adjusted to provide a lateral gap of appropriate width between the cutting wheels in order to cut material of varying thickness without bending the cut edge and that can be used in combination with any sheet metal brake to make straight cuts or without a sheet metal brake for freehand straight or curved cuts.

SUMMARY OF THE INVENTION

Accordingly, it is an object of the present invention to provide a sheet material cutter having cooperating cutting wheels that can be easily adjusted to provide a lateral gap of varying width between the cutting edges. A second object of the invention is to provide such a sheet metal cutter that is small and lightweight, so that an individual at a job site can easily carry it. A third object of the invention is to provide such a cutter that can be used in combination with any sheet metal brake to make straight cuts or without any sheet metal brake for freehand cutting.

What is disclosed is a small, handheld sheet material cutter having a pair of cooperating cutting wheels that can be easily adjusted to provide a lateral gap of varying width in order to cleanly cut sheet material of various thicknesses, as well as a guide bar that can be used in combination with any sheet metal brake to provide straight cuts. Since the cutter need not be mounted on a sheet metal brake, it can also be used freehand to cut curves and angles.

DETAILED DESCRIPTION OF THE INVENTION

Figure 1:
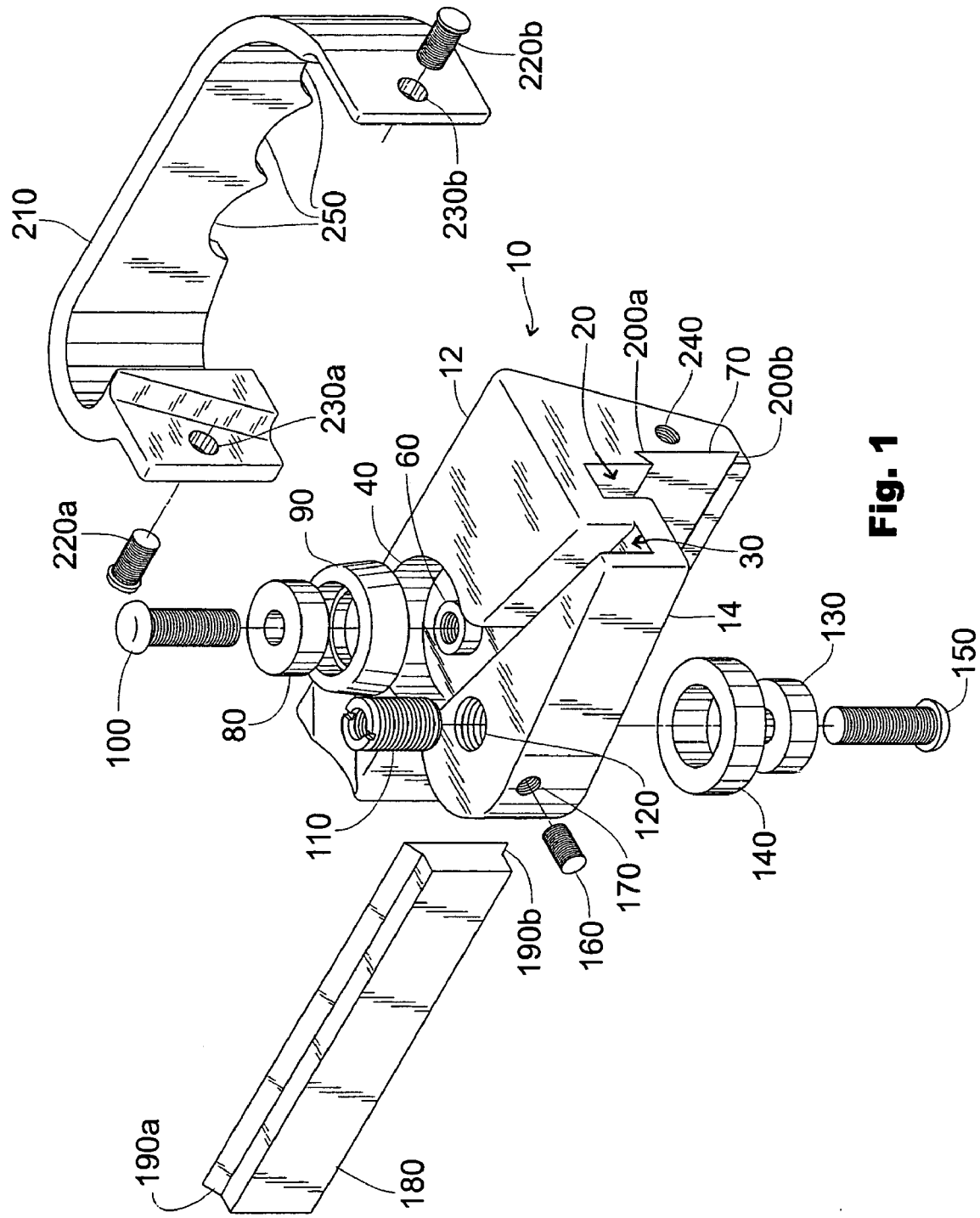
FIG. 1 is an exploded view showing a sheet material cutter of the present invention.

Referring to FIGS. 1–4, a sheet material cutter of the present invention has a body, generally designated as 10, preferably manufactured of lightweight, durable metal. Body 10 generally comprises an upper body portion 12 and a lower body portion 14, which are joined toward the rear of body 10, but are spaced apart at the front to form an infeed region 16 (most clearly seen in FIG. 2) for receiving sheet material to be cut. Behind infeed region 16, body 10 has a transverse guide recess 20 on one side and an inclined guide recess 30 on the other for guiding the pieces of sheet material after they have been severed. While it is possible within the scope of the present invention to provide a cutter having the guide recesses parallel to each other or inclined in opposite directions, it is preferable that one guide recess be transverse and the other inclined to increase the ease of cutting.

Upper body portion 12 has an upper cutting wheel recess 40, an internally threaded upper cutting wheel boss 60, and a guide bar receiving groove 70. Upper cutting wheel bearing 80 is held within upper cutting wheel 90 via a press fit and is retained on upper cutting wheel boss 60 by upper cutting wheel bolt 100. Lower body portion 14 has a lower cutting wheel recess 50, shown in cross-section in FIG. 3, on the side opposite the side of upper body portion 12 having upper cutting wheel recess 40. A cylindrical gap adjustment insert 110 having both internal and external threads into threaded throughhole 120 in lower body portion 14 and protrudes into lower cutting wheel recess 50. Lower cutting wheel bearing 130 is held within lower cutting wheel 140 via a press fit and is retained on the end of gap adjustment insert 110 within lower cutting wheel recess 50 by lower cutting wheel bolt 150. Setscrew 160 threads into throughhole 170 and impinges on gap adjustment insert 110.

Figure 3:
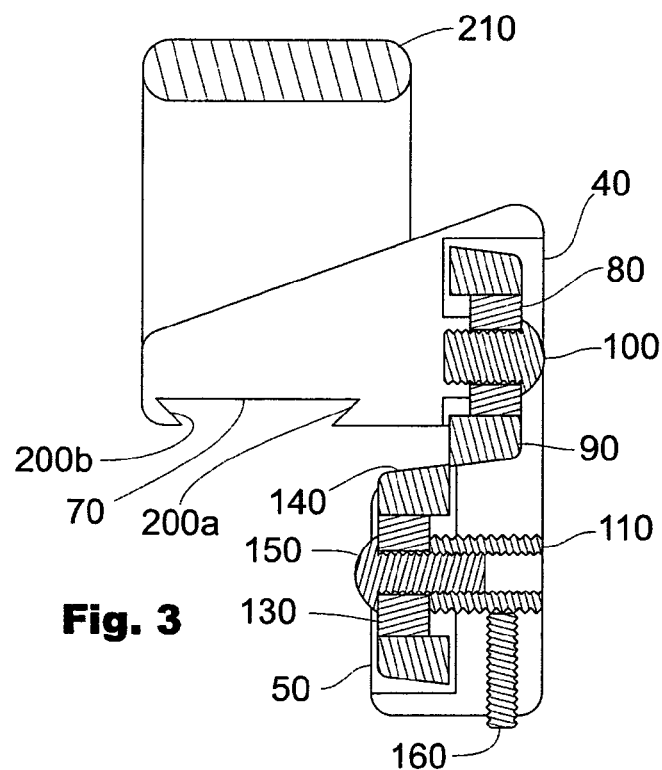
FIG. 3 is a cross-sectional end view of a sheet material cutter of the present invention taken along line 3—3 from FIG. 2.
Figure 4:
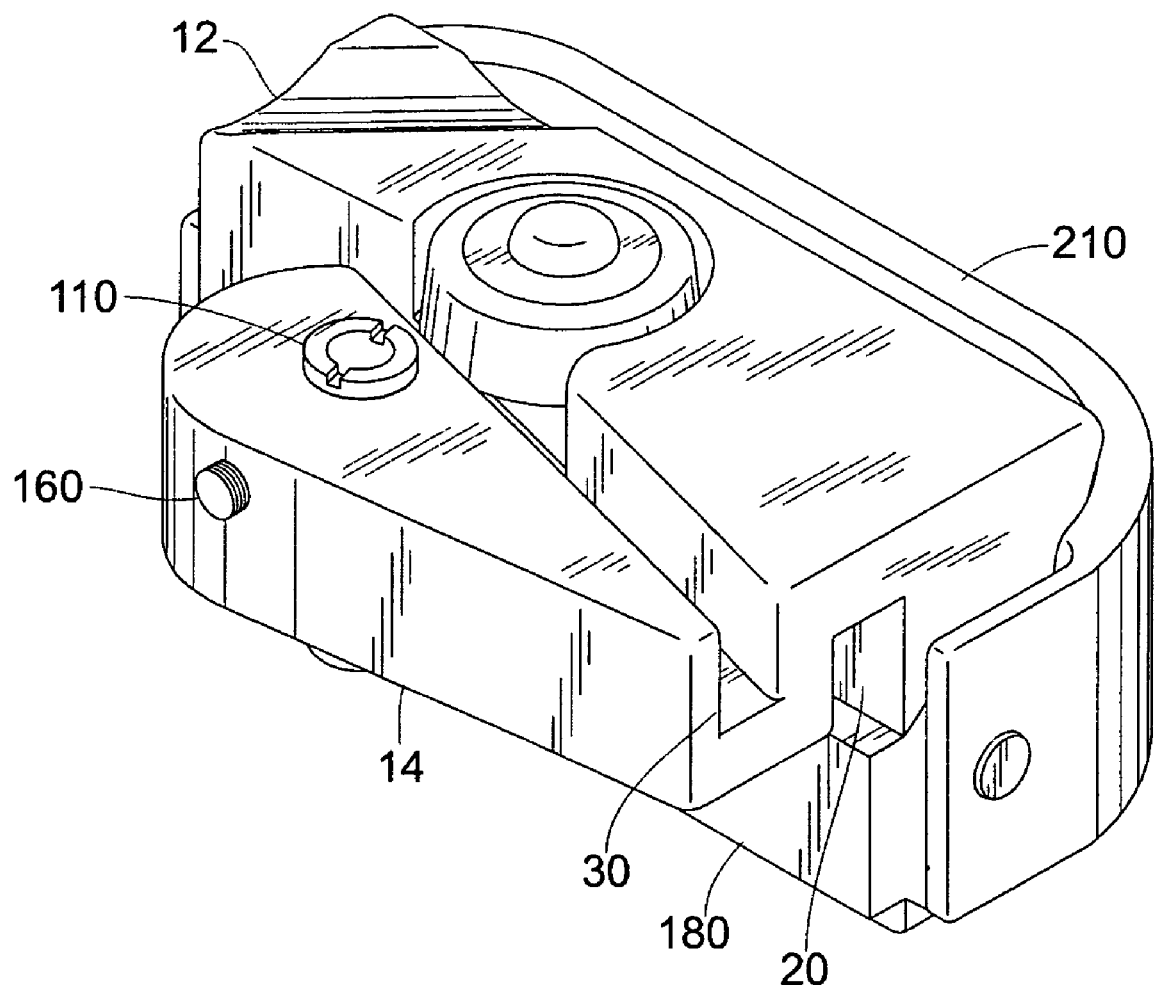
FIG. 4 is a perspective view of a sheet material cutter of the present invention.
Figure 5:
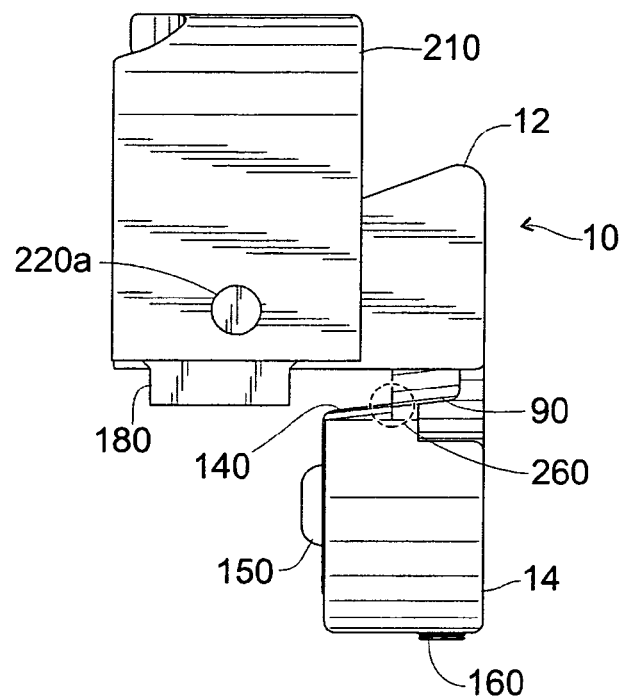
FIG. 5 is an end view of a sheet material cutter of the present invention showing the cutting edges of the cutting wheels adjacent one another with no gap.

As most clearly seen in FIG. 3, the gap between the cutting edges of upper cutting wheel 90 and lower cutting wheel 140 can be easily adjusted by first loosening set screw 160, then turning gap adjustment insert 110 to adjust the amount of gap adjustment insert 110 that projects from throughhole 120 into lower wheel recess 50. Increasing the amount of gap adjustment insert 110 that projects into lower wheel recess 50 will result in a larger gap between the cutting edges, while decreasing the amount of projection will reduce the gap. In a preferred embodiment, the end of gap adjustment insert 110 that does not project into lower wheel recess 50 has means to facilitate easy rotation of gap adjustment insert 110 in throughhole 120. Examples of such means include a recess for engaging a screw driver, a recess for engaging an allen wrench, a raised portion for engaging a wrench, and a raised portion that can be gripped by the user's fingers. Other such adaptations will be apparent to those skilled in the art and are included within the scope of the invention. Once the desired gap has been achieved, setscrew 160 can be tightened against gap adjustment insert 110 to securely hold the desired gap. FIG. 5 illustrates the position of the upper and lower cutting wheels 90 and 140, respectively, when adjusted so that there is direct contact 260 between the cutting edges, while FIG. 6 illustrates the cutting wheels adjusted to provide a small gap 270 between the cutting edges.

Referring again to FIGS. 1–4, guide bar 180 has a lower planar surface and a straight edge that faces away from body 10. Guide bar 180 is preferably manufactured of nylon or similar material that will not mar the surface of the material to be cut. Guide bar 180 can be attached to body 10 by various means, such as screws inserted through holes in the top of body 10 or an adhesive bond. In the preferred embodiment illustrated, guide bar 180 is manufactured with lateral wings 190a and 190b on either side of the top thereof. Guide bar 180 slides into guide bar receiving groove 70, with lateral wings 190a and 190b fitting into corresponding recesses 200a and 200b. Guide bar 180 is retained in guide bar receiving groove 70 by the ends of handle 210, which are secured to body 10 by screws 220a and 220b, which pass through handle throughholes 230a and 230b and thread into holes 240 on either end of body 10, immediately above guide bar receiving groove 70. Handle 210 is preferably manufactured of lightweight metal and preferably has optional indentations 250 in one edge to accommodate the fingers of a user gripping handle 210.

Figure 2:
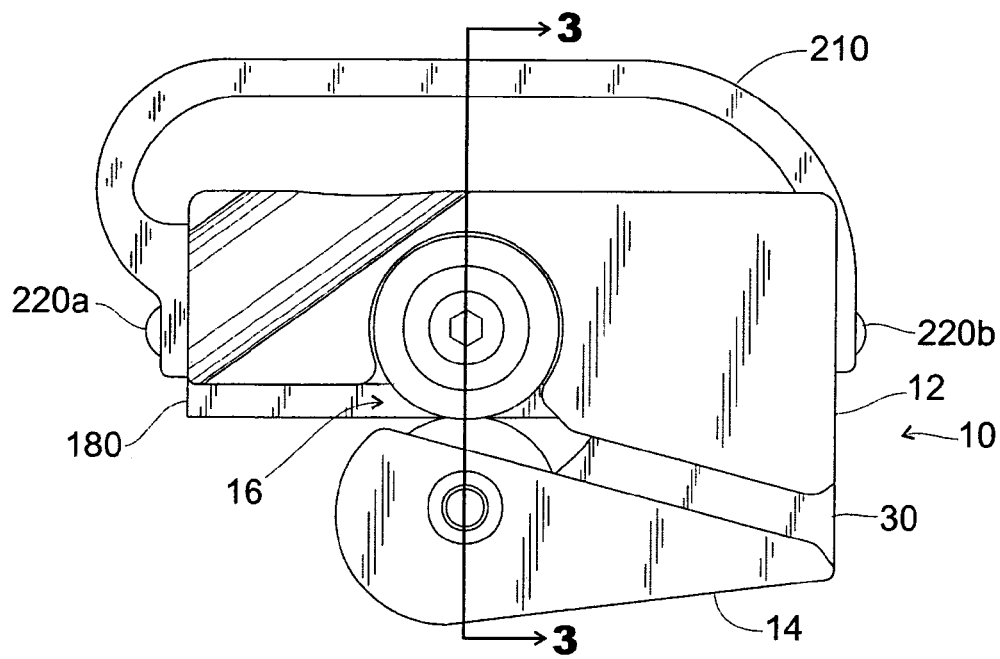
FIG. 2 is an elevational view of a sheet material cutter of the present invention.
Figure 6:
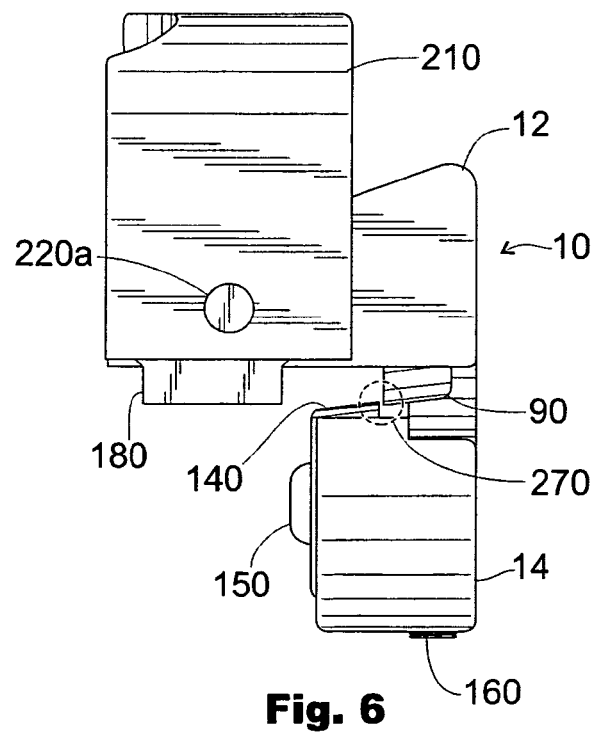
FIG. 6 is an end view of a sheet material cutter of the present invention showing the cutting wheels adjusted to provide a gap between the cutting edges.

As most clearly seen in FIGS. 2, 5, and 6, the lower planar surface of guide bar 180 is in approximately the same horizontal plane as the cutting zone formed by the cooperating cutting edges of upper and lower cutting wheels 90 and 140, so that guide bar 180 can slide across the top of a piece of sheet material as it is being cut. Guide bar 180 thus provides a simple means for a user to use the present invention in combination with any sheet metal brake in order to make a straight cut across a work piece. With the work piece clamped in the brake, the sheet material cutter is brought into position to begin a cut, with the cutting edges of upper cutting wheel 90 and lower cutting wheel 140 at the edge of the work piece, the forward portion of guide bar 180 resting on top of the sheet material, and the long edge of guide bar 180 abutting the upper clamping unit of the sheet metal brake. By keeping the edge of guide bar 180 against the upper clamping unit of the sheet metal brake while pushing the sheet material cutter through the work piece, the user can make a straight cut without having to mount the cutter on the brake, as is required with prior art cutters. Since the cutter does not have to be mounted on a brake, it can also be easily used for cutting curves and angles.

According to the provisions of the patent statutes, we have explained the principle, preferred construction, and mode of operation of the invention, and have illustrated and described what we now consider to represent its best embodiments. However, it should be understood that within the scope of the appended claims and the foregoing description, the invention may be practiced otherwise than specifically illustrated and described.

I claim:

1. A hand-held cutter for cutting sheet material, said cutter comprising:
   (a) a body having a front end, a back end, an upper body portion, a lower body portion, and two sides, wherein said upper and lower body portions are joined toward said back end and spaced apart toward said front end to form a forward-opening infeed region between said upper and lower body portions for receiving sheet material to be cut;
   (b) an upper cutting wheel supported on said upper body portion within an upper cutting wheel recess on one side of said upper body portion and a lower cutting wheel supported on said lower body portion within a lower cutting wheel recess on the side opposite the side having the upper cutting wheel recess, both of said cutting wheels having sharpened, beveled cutting edges, wherein said cutting wheels are rotatable about parallel axes, and wherein said cutting wheels are arranged on said body such that said cutting edges oppose and overlap one another in offset relationship forming a nip point in said infeed region between said upper and lower body portions for cutting engagement with sheet material passed between said cutting wheels in order to cut said sheet material along a line of cut; and
   (c) means for adjustably providing and maintaining a lateral gap between said cutting edges.

2. The cutter of claim 1, further comprising a handle attached to the body for manually propelling said cutter along a sheet of sheet material disposed between said cutting wheels such that said sheet material is cut by said cutting wheels.

3. The cutter of claim 2, wherein the handle has a plurality of indentations for engaging fingers of a hand gripping said handle.

4. The cutter of claim 1, further comprising a guide bar attached to the body, said guide bar having a straight edge facing away from said cutter parallel to the line of cut and a lower planar surface in approximately the same horizontal plane as said line of cut, such that said guide bar can slide along the top of a sheet of material disposed between the cutting wheels as said material is being cut.

5. The cutter of claim 1, wherein the body includes guide recesses on either side thereof, each of said guide recesses having an opening adjacent to the cutting wheels and in communication with the infeed region between the upper and lower body portions for receiving and guiding opposed severed edges of sheet material as said cutter is propelled along said sheet material.

6. The cutter of claim 5, wherein the guide recesses diverge from one another in separate planes in a direction away from the openings adjacent to the cutting wheels.

7. The cutter of claim 1, wherein the means for adjustably providing and maintaining a lateral gap between the cutting edges comprises:
   (a) a cylindrical gap adjustment insert having a first end, a second end, internal threads, and external threads, said cylindrical gap adjustment insert threadably engaging a gap adjustment throughhole in the lower body portion such that said first end of said gap adjustment insert projects out of said gap adjustment throughhole into the lower cutting wheel recess, wherein the lower cutting wheel is rotatably retained on said first end of said gap adjustment insert by a bolt that passes through an axial opening in said lower cutting wheel and threadably engages said internal threads of said cylindrical gap adjustment insert; and
   (b) a setscrew that threadably engages a throughhole extending from an outer surface of said body to the lumen of said gap adjustment throughhole, such that said setscrew, when tightened, firmly impinges against the cylindrical gap adjustment insert disposed within said gap adjustment throughhole, whereby movement of said cylindrical gap adjustment insert is prevented, wherein a lateral gap between said cutting edges of said cutting wheels can be adjusted by loosening said setscrew, turning said cylindrical gap adjustment insert to increase or decrease the width of said gap, as desired, and tightening said setscrew to maintain the desired gap width.

8. The cutter of claim 7, wherein the second end of the cylindrical gap adjustment insert has means adapted to facilitate rotation of said cylindrical gap adjustment insert in the gap adjustment throughhole.

9. The cutter of claim 8, wherein the means adapted to facilitate rotation of the cylindrical gap adjustment insert is chosen from the group consisting of a recess for engaging a screwdriver, a recess for engaging an allen wrench, a raised portion for engaging a wrench, and a raised portion that can be gripped by fingers.

10. The cutter of claim 1, wherein the means for adjustably providing and maintaining a lateral gap between the cutting edges comprises:
    (a) a cylindrical gap adjustment insert having a first end, a second end, internal threads, and external threads, said cylindrical gap adjustment insert threadably engaging a gap adjustment throughhole in the upper body portion such that the first end of said gap adjustment insert projects out of said gap adjustment throughhole into the upper cutting wheel recess, wherein the upper cutting wheel is rotatably retained on said first end of said gap adjustment insert by a bolt that passes through an axial opening in said upper cutting wheel and threadably engages said internal threads of said cylindrical gap adjustment insert; and
    (b) a setscrew that threadably engages a throughhole extending from an outer surface of said body to the lumen of said gap adjustment throughhole, such that said setscrew, when tightened, firmly impinges against the cylindrical gap adjustment insert disposed within said gap adjustment throughhole, whereby movement of said cylindrical gap adjustment insert is prevented, wherein a lateral gap between said cutting edges of said cutting wheels can be adjusted by loosening said setscrew, turning said cylindrical gap adjustment insert to increase or decrease the width of said gap, as desired, and tightening said setscrew to maintain the desired gap width.

11. The cutter of claim 10, wherein the second end of the cylindrical gap adjustment insert has means adapted to facilitate rotation of said cylindrical gap adjustment insert in the gap adjustment throughhole.

12. The cutter of claim 11, wherein the means adapted to facilitate rotation of the cylindrical gap adjustment insert is chosen from the group consisting of a recess for engaging a screwdriver, a recess for engaging an allen wrench, a raised portion for engaging a wrench, and a raised portion that can be gripped by fingers.

13. A hand-held cutter for cutting sheet material, said cutter comprising:
    (a) a body having a front end, a back end, an upper body portion, a lower body portion, and two sides, wherein said upper and lower body portions are joined toward said back end and spaced apart toward said front end to form a forward-opening infeed region between said upper and lower body portions for receiving sheet material to be cut;
    (b) an upper cutting wheel supported on said upper body portion within an upper cutting wheel recess on one side of said upper body portion and a lower cutting wheel supported on said lower body portion within a lower cutting wheel recess on the side opposite the side having the upper cutting wheel recess, both of said cutting wheels having sharpened, beveled cutting edges, wherein said cutting wheels are rotatable about parallel axes, and wherein said cutting wheels are arranged on said body such that said cutting edges oppose and overlap one another in offset relationship forming a nip point in said infeed region between said upper and lower body portions for cutting engagement with sheet material passed between said cutting wheels in order to cut said sheet material along a line of cut;
    (c) a handle attached to said body for manually propelling said cutter along a sheet of sheet material disposed between said cutting wheels such that said sheet material is cut by said cutting wheels;
    (d) a guide bar attached to said body, said guide bar having a straight edge facing away from said cutter parallel to said line of cut and a lower planar surface in approximately the same horizontal plane as said line of cut, such that said guide bar can slide along the top of a sheet of material disposed between said cutting wheels as said material is being cut;
    (e) guide recesses on either side of said body, each of said guide recesses having an opening adjacent to said cutting wheels and in communication with said infeed region between said upper and lower body portions for receiving and guiding opposed severed edges of sheet material as said cutter is propelled along said sheet material, wherein said guide recesses diverge from one another in separate planes in a direction away from said openings adjacent to said cutting wheels;
    (f) a cylindrical gap adjustment insert having a first end, a second end, internal threads, and external threads, said cylindrical gap adjustment insert threadably engaging a gap adjustment throughhole in said lower body portion such that said first end of said gap adjustment insert projects out of said gap adjustment throughhole into said lower cutting wheel recess, wherein said lower cutting wheel is rotatably retained on said first end of said gap adjustment insert by a bolt that passes through an axial opening in said lower cutting wheel and threadably engages said internal threads of said cylindrical gap adjustment insert; and (g) a setscrew that threadably engages a throughhole extending from an outer surface of said body to the lumen of said gap adjustment throughhole, such that said setscrew, when tightened, firmly impinges against said cylindrical gap adjustment insert disposed within said gap adjustment throughhole, whereby movement of said cylindrical gap adjustment insert is prevented, wherein a lateral gap between said cutting edges of said cutting wheels can be adjusted by loosening said setscrew, turning said cylindrical gap adjustment insert to increase or decrease the width of said gap, as desired, and tightening said setscrew to maintain the desired gap width.

* * * * *